US012221827B2

(12) United States Patent
Fontaine et al.

(10) Patent No.: US 12,221,827 B2
(45) Date of Patent: *Feb. 11, 2025

(54) DOOR FRAME AND THRESHOLD ASSEMBLY

(71) Applicant: Upstate Door, Inc., Warsaw, NY (US)

(72) Inventors: Robert James Fontaine, South Wales, NY (US); David Richard Fontaine, Strykersville, NY (US)

(73) Assignee: UPSTATE DOOR, INC., Warsaw, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,392

(22) Filed: Sep. 15, 2023

(65) Prior Publication Data

US 2024/0003180 A1 Jan. 4, 2024

Related U.S. Application Data

(63) Continuation of application No. 17/367,839, filed on Jul. 6, 2021, now Pat. No. 11,795,758.

(51) Int. Cl.

*E06B 7/14* (2006.01)
*E06B 1/70* (2006.01)
*E06B 7/22* (2006.01)
*E06B 7/23* (2006.01)

(52) U.S. Cl.

CPC .................. *E06B 7/14* (2013.01); *E06B 1/70* (2013.01); *E06B 7/22* (2013.01); *E06B 7/2316* (2013.01)

(58) Field of Classification Search

CPC ............. E06B 7/14; E06B 7/2316; E06B 1/70
USPC ........................................................... 49/471
See application file for complete search history.

(56) References Cited

U.S. PATENT DOCUMENTS 4,831,779 A * 5/1989 Kehrli ....................... E06B 7/14 49/471
5,067,279 A * 11/1991 Hagemeyer ........... E06B 7/2316 49/470
5,179,804 A 1/1993 Young
5,687,508 A 11/1997 Fitzhenry, Jr. et al.
(Continued)

FOREIGN PATENT DOCUMENTS

CA 2954582 7/2018
DE 202015105613 12/2016
(Continued)

*Primary Examiner* — Marcus Menezes

(74) *Attorney, Agent, or Firm* — Simpson & Simpson, PLLC

(57) ABSTRACT

A door frame and threshold assembly including a substantially closed reservoir tube having a first plurality of spaced apart weep holes therein and a second plurality of spaced apart weep holes, an interior sill portion arranged on a ceiling of the reservoir tube, the interior sill portion having a first sloped surface having a descending slope arranged in a direction towards the plurality of spaced apart weep holes, and an exterior sill portion at least abutting one of a pair of sidewalls of the closed reservoir tube, the exterior sill portion having a second sloped surface having a descending slope arranged in a direction away from the closed reservoir tube, wherein a channel is formed by the ceiling of the closed reservoir tube, an edge of the interior sill portion, and an edge of the exterior sill portion.

15 Claims, 6 Drawing Sheets

(56) References Cited

U.S. PATENT DOCUMENTS

| | | | | |
|---|---|---|---|---|
| 5,956,909 | A * | 9/1999 | Chou | E06B 7/2316 52/302.1 |
| 8,132,370 | B2 | 3/2012 | Heppner | |
| 8,448,384 | B2 | 5/2013 | Wernlund et al. | |
| 8,499,498 | B2 | 8/2013 | Heppner | |
| 8,683,747 | B2 * | 4/2014 | Kim | E06B 7/14 49/404 |
| 8,857,107 | B1 * | 10/2014 | Key | E06B 1/70 52/12 |
| 9,562,387 | B2 | 2/2017 | Meeks | |
| 10,087,678 | B2 | 10/2018 | Pettibone | |
| 10,472,882 | B1 | 11/2019 | Pettibone | |
| 10,494,857 | B2 | 12/2019 | Meeks | |
| 10,577,854 | B1 | 3/2020 | Salmeron | |
| 10,895,103 | B2 | 1/2021 | Alkhoury et al. | |
| 2006/0225364 | A1 | 10/2006 | Chen | |
| 2010/0300001 | A1 * | 12/2010 | Wernlund | E06B 7/14 49/471 |
| 2012/0005975 | A1 | 1/2012 | Kim | |
| 2014/0041326 | A1 | 2/2014 | Kadavy et al. | |
| 2015/0096235 | A1 | 4/2015 | Rochman | |
| 2016/0273260 | A1 | 9/2016 | Jolie et al. | |
| 2019/0264490 | A1 | 8/2019 | Careri | |
| 2020/0087976 | A1 | 3/2020 | Bagnall et al. | |
| 2022/0162901 | A1 | 5/2022 | Header | |

FOREIGN PATENT DOCUMENTS

| | | |
|---|---|---|
| FR | 2952115 | 5/2011 |
| GB | 2198174 | 6/1988 |
| WO | 2005118996 | 12/2005 |

* cited by examiner

DOOR FRAME AND THRESHOLD ASSEMBLY

CROSS-REFERENCE TO RELATED APPLICATIONS

This application is a continuation of and claims priority pursuant to 35 U.S.C. 120 to U.S. patent application Ser. No. 17/367,839, filed on Jul. 6, 2021, which application is incorporated by reference herein in its entirety.

FIELD

The present invention relates to a door and door frames, specifically, to a door frame and threshold assembly that prevents the ingress of weather elements and drains water away from an enclosure.

BACKGROUND

A door is a hinged or otherwise movable barrier that allows ingress into and egress from an enclosure (i.e., house, vehicle, etc.). The created opening in the wall is a doorway or portal. A door's essential and primary purpose is to provide security by controlling access to the doorway. Conventionally, a door is a panel that fits into the portal of a building, room, or vehicle. Doors are generally made of a material suited to the door's task. Doors are commonly attached by hinges, but can move by other means, such as slides or counterbalancing. The door may be moved in various ways (at angles away from the portal, by sliding on a plane parallel to the frame, by folding in angles on a parallel plane, or by spinning along an axis at the center of the frame) to allow or prevent ingress or egress. In most cases, a door's interior matches its exterior side. But in other cases (e.g., a vehicle door) the two sides are radically different.

Since, unlike a fixed wall, a door opens and closes, it is susceptible to penetration by the various elements of weather, such as wind, rain, snow, etc., as well as insects, leaves, dust, etc. As such, it is important that a door provide a sufficient barrier for weather. A door interacts with a door frame and threshold to combat penetration of various elements. However, current door frame and threshold assembly designs lack the ability to resist water penetration, thus allowing water into the enclosure. Also, current door frame and threshold assembly designs also lack the ability to efficiently collect and drain water, which aids in defending against weather element penetration.

Thus, there is a long felt need for a door frame and threshold assembly that prevents the ingress of weather elements and efficiently collects and drains water away from the enclosure.

SUMMARY

According to aspects illustrated herein, there is provided a door frame and threshold assembly, comprising a reservoir tube, including a first top surface comprising at least one inlet weep hole, a first rear surface, a first bottom surface, and a first front surface comprising at least one outlet weep hole, an interior sill portion, including a second top surface, a third top surface arranged adjacent and elevationally below the second top surface, the third top surface angled elevationally downward in a first direction, and a second bottom surface arranged on the first top surface, an exterior sill portion, including a fourth top surface angled elevationally downward in the first direction, a second rear surface engaged with the reservoir tube and spaced apart from the interior sill portion, a third bottom surface, and a second front surface, and a sill pan operatively arranged under and spaced apart from at least one of the first bottom surface and the third bottom surface, wherein the sill pan forms a conduit in fluid communication with the outlet weep hole.

In some embodiments, the door frame and threshold assembly further comprises an L-shaped nose, including a fifth top surface, a third rear surface connected to the second front surface, and a fourth bottom surface including a drip kerf, wherein the fourth bottom surface is arranged elevationally below the conduit. In some embodiments, the fifth top surface is curvilinear. In some embodiments, the third rear surface comprises a notch extending therefrom in the first direction, wherein the notch and the sill pan form an outlet to the conduit, the outlet directed in a second direction, the second direction being perpendicular to the first direction. In some embodiments, the fifth top surface is arranged elevationally below the fourth top surface. In some embodiments, the second rear surface comprises a notch extending therefrom in the first direction, the notch abutting against both the first top surface and the first front surface. In some embodiments, the third bottom surface comprises a notch extending therefrom in a second direction, the second direction being perpendicular to the first direction, and the notch is in fluid communication with the at least one outlet weep hole. In some embodiments, the door frame and threshold assembly further comprises a door stop connected to the fourth top surface, the door stop including a fifth top surface, and a sixth top surface arranged adjacent and elevationally below the fifth top surface, the sixth top surface angled elevationally downward in the first direction.

In some embodiments, the door frame and threshold assembly further comprises a door, the door including a seventh top surface, a third rear surface, a fourth bottom surface including a first channel including a first weather stripping, the first weather stripping operatively arranged to sealingly engage the door stop, and a third front surface. In some embodiments, the fourth bottom surface further comprises a second channel including a second weather stripping, the second weather stripping operatively arranged to sealingly engage the second top surface. In some embodiments, the door frame and threshold assembly further comprises a drip cap connected to the third front surface, the drip cap including a fourth top surface extending elevationally downward in the first direction, and a fourth bottom surface including a drip kerf and a second channel including a weather sweep, the weather sweep operatively arranged to sealingly engage the door stop. In some embodiments, the door frame and threshold assembly further comprises a head jamb, wherein the seventh top surface comprises a second channel including a second weather stripping and a third channel including a third weather stripping, and the second weather stripping and the third weather stripping are operatively arranged to sealingly engage the head jamb. In some embodiments, the door frame and threshold assembly further comprises a head casing connected to the head jamb and including a drip kerf.

According to aspects illustrated herein, there is provided a door frame and threshold assembly, comprising a reservoir tube, including a first top surface comprising at least one inlet weep hole, a first rear surface, a first bottom surface, and a first front surface comprising at least one outlet weep hole, an interior sill portion, including a second top surface, a third top surface arranged adjacent and elevationally below the second top surface, the third top surface angled elevationally downward in a first direction, and a second bottom surface arranged on the first top surface, an exterior sill portion, including a fourth top surface angled elevationally downward in the first direction, a second rear surface engaged with the reservoir tube and spaced apart from the interior sill portion, a third bottom surface, and a second front surface, a sill pan operatively arranged under and spaced apart from at least one of the first bottom surface and the third bottom surface, wherein the sill pan forms a conduit in fluid communication with the outlet weep hole, a door stop connected to the fourth top surface, the door stop including a fifth top surface, and a sixth top surface arranged adjacent and elevationally below the fifth top surface, the sixth top surface angled elevationally downward in the first direction, and a door, the door including a seventh top surface, a third rear surface, a fourth bottom surface including a first weather stripping, the first weather stripping operatively arranged to sealingly engage the door stop, and a third front surface.

In some embodiments, the fourth bottom surface further comprises a second weather stripping operatively arranged to sealingly engage the second top surface, and a third weather stripping operatively arranged to engage the fifth top surface, wherein the first weather stripping is arranged between the second weather stripping and the third weather stripping. In some embodiments, the door frame and threshold assembly further comprises an L-shaped nose, including an eighth top surface, the eight top surface being curvilinear and arranged elevationally below the fourth top surface, a fourth rear surface connected to the second front surface, and a fifth bottom surface including a drip kerf, wherein the fourth bottom surface is arranged elevationally below the conduit. In some embodiments, the third rear surface comprises a notch extending therefrom in the first direction, wherein the notch and the sill pan form an outlet to the conduit, the outlet directed in a second direction, the second direction being perpendicular to the first direction. In some embodiments, the door frame and threshold assembly further comprises a drip cap connected to the third front surface, the drip cap including an eighth top surface extending elevationally downward in the first direction, a fifth bottom surface including a drip kerf and a weather sweep, the weather sweep operatively arranged to sealingly engage the sixth top surface. In some embodiments, the door frame and threshold assembly further comprises a head jamb, wherein the seventh top surface comprises a second weather stripping and a third weather stripping, the second weather stripping and the third weather stripping are operatively arranged to sealingly engage the head jamb, and the head jamb comprises a drip kerf. In some embodiments, the door frame and threshold assembly further comprises a screen or storm door spaced apart operatively arranged to engage the head jamb and the second front surface, the screen or storm door including an eighth top surface angled elevationally downward in the first direction, and operatively arranged to be vertically aligned with the drip kerf.

According to aspects illustrated herein, there is provided a door threshold assembly comprising an interior sill portion, an exterior sill portion, the interior sill portion and the exterior sill portion separated by a first distance, and a reservoir channel arranged between the interior sill portion and the exterior sill portion, the reservoir channel comprising at least one entrance aperture in fluid communication with the interior sill portion and at least one exit aperture.

In some embodiments, the door threshold assembly further comprises a sill pan, wherein the exterior sill portion is shimmed a second distance from the sill pan forming a duct. In some embodiments, the at least one exit aperture is in fluid communication with the duct. In some embodiments, the door threshold assembly further comprises a nose engaged with the exterior sill portion, the nose extending elevationally below the sill pan.

In further arrangements, the present invention may comprise a door frame and threshold assembly, the assembly including a substantially closed reservoir tube bounded by a floor, a first sidewall, a second sidewall and a ceiling, the ceiling having a first plurality of spaced apart weep holes therein and in communication with the reservoir tube, a second plurality of spaced apart weep holes arranged in one of: the first sidewall; and, the second sidewall, an interior sill portion arranged on the ceiling of the reservoir tube, the interior sill portion having a first sloped surface having a descending slope arranged in a direction towards the plurality of spaced apart weep holes, and, an exterior sill portion at least abutting one of the sidewalls of the closed reservoir tube, the exterior sill portion having a second sloped surface having a descending slope arranged in a direction away from the closed reservoir tube, wherein a channel is formed by the ceiling of the closed reservoir tube, an edge of the interior sill portion, and an edge of the exterior sill portion, the channel in communication with the first plurality of spaced apart weep holes.

In other arrangements, the present invention could comprise a door frame and threshold assembly, the assembly comprising a substantially closed reservoir tube bounded by a floor, a first sidewall, a second sidewall and a ceiling, the ceiling having a first plurality of spaced apart weep holes therein and in communication with the reservoir tube, a second plurality of spaced apart weep holes arranged in one of: the first sidewall; and, the second sidewall, an interior sill portion arranged on the ceiling of the reservoir tube, the interior sill portion having a first sloped surface having a descending slope arranged in a direction towards the plurality of spaced apart weep holes, and an exterior sill portion at least abutting one of the sidewalls of the closed reservoir tube, the exterior sill portion having a second sloped surface having a descending slope arranged in a direction away from the closed reservoir tube, the exterior sill portion having a lower notch arranged proximate the second plurality of weep holes, wherein an upper channel is formed by the ceiling of the closed reservoir tube, an edge of the interior sill portion, and an edge of the exterior sill portion, wherein a lower channel is formed by the lower notch of exterior sill portion and one of the sidewalls of the closed reservoir tube.

According to aspects illustrated herein, there is provided a wood door sill/threshold including a fiberglass channel with drainage holes and a 3/16" shim that allows liquid to escape from under the nose of the sill.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
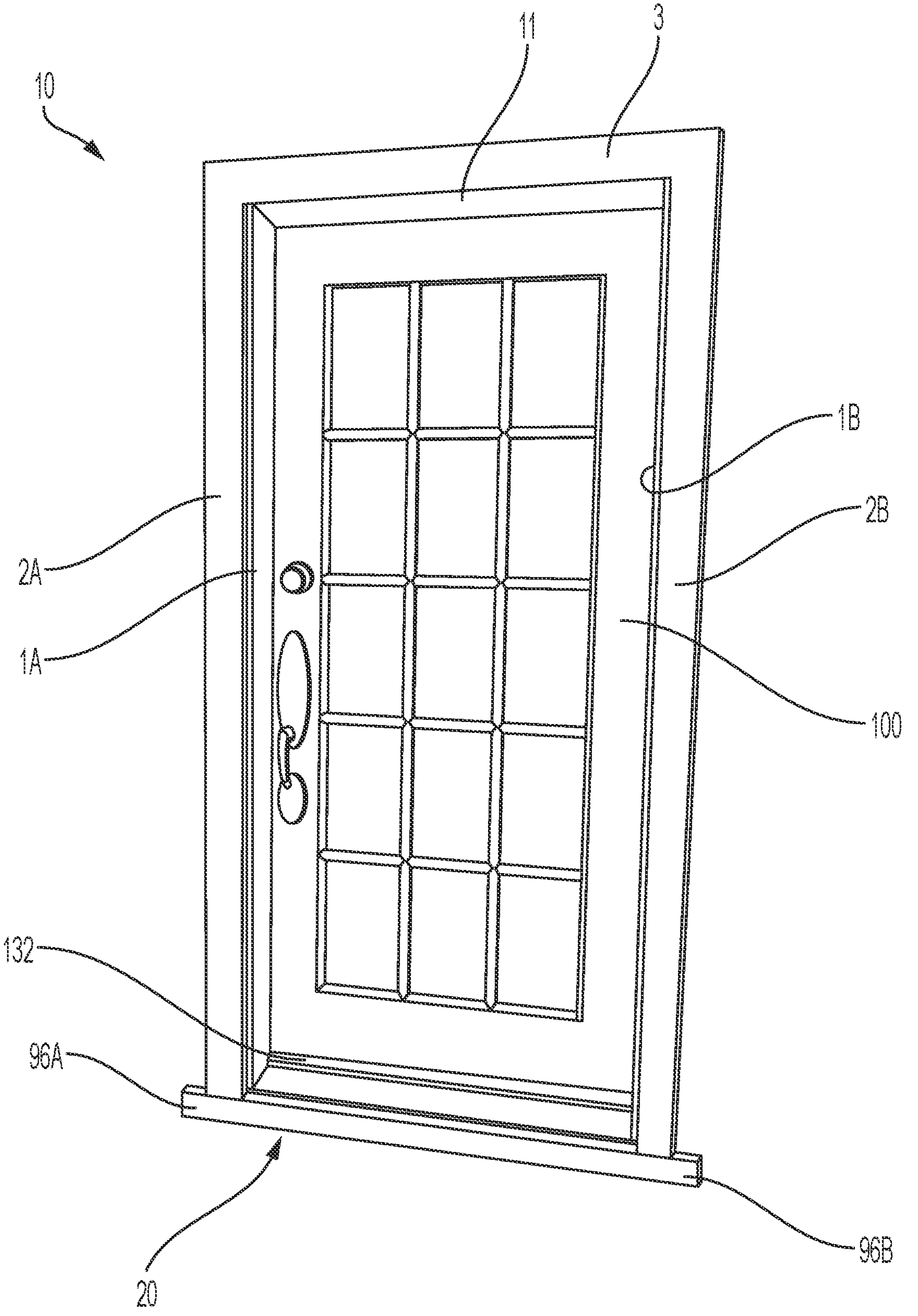
FIG. 1 is a perspective view of a door frame and threshold assembly.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be noted that the terms "has", "having", "includes", "including", "contains", and/or "containing", are to be interpreted as substantially synonymous with "comprises" and/or "comprising".

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

By "rear" it is meant that such element faces toward the interior of the enclosure. By "front" it is meant that such element faces toward the exterior of the enclosure. By "top" it is meant that the element faces up toward the sky. By "bottom" it is meant that the element faces down toward the ground.

Adverting now to the figures, FIG. 1 is a perspective view of door frame and threshold assembly 10. Door frame and threshold assembly 10 generally comprises jamb 1A, jamb 1B, head casing 3, head jamb 11, door threshold assembly 20, and door 100. Door frame and threshold assembly 10 may further comprise casing 2A associated with jamb 1A and casing 2B associated with jamb 1B. Door 100 is hingedly connected, on one side, to one of side jambs 1A and 1B. Door 100 may include any necessary hardware, for example, a handle, deadbolt, locks, etc. Door 100 may or may not include windows. In some embodiments, and as shown, door threshold assembly 20 comprises horns 96A-B which extend laterally beyond casing 2A and casing 2B, respectively.

Figure 2:
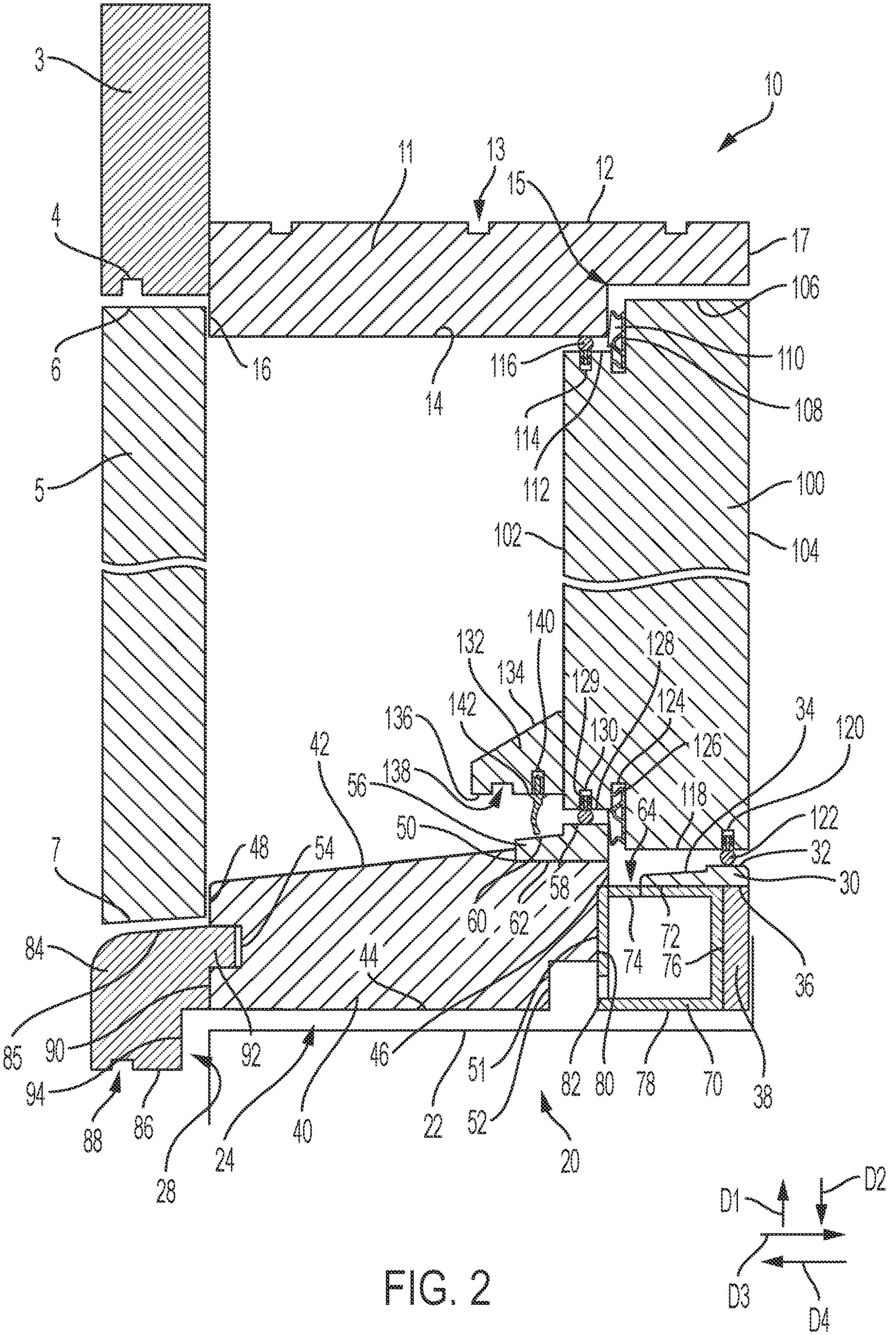
FIG. 2 is a partial cross-sectional schematic view of the door frame and threshold assembly shown in FIG. 1.
Figure 3:
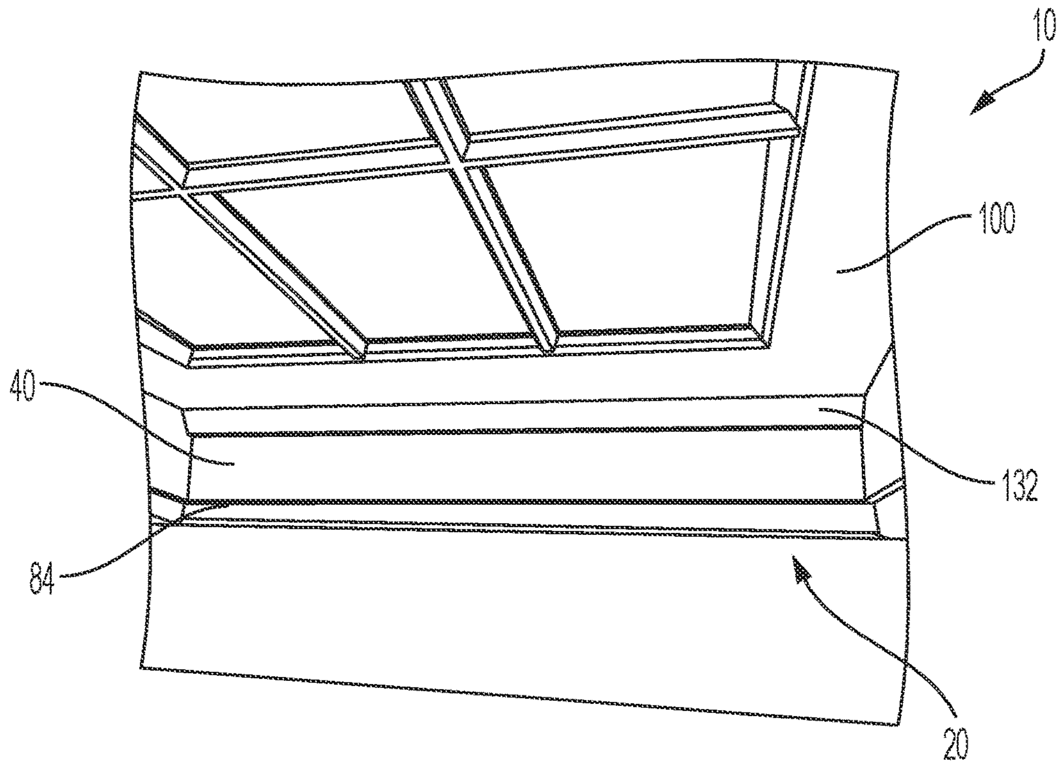
FIG. 3 is a top partial perspective view of the door frame and threshold assembly shown in FIG. 1.
Figure 4:
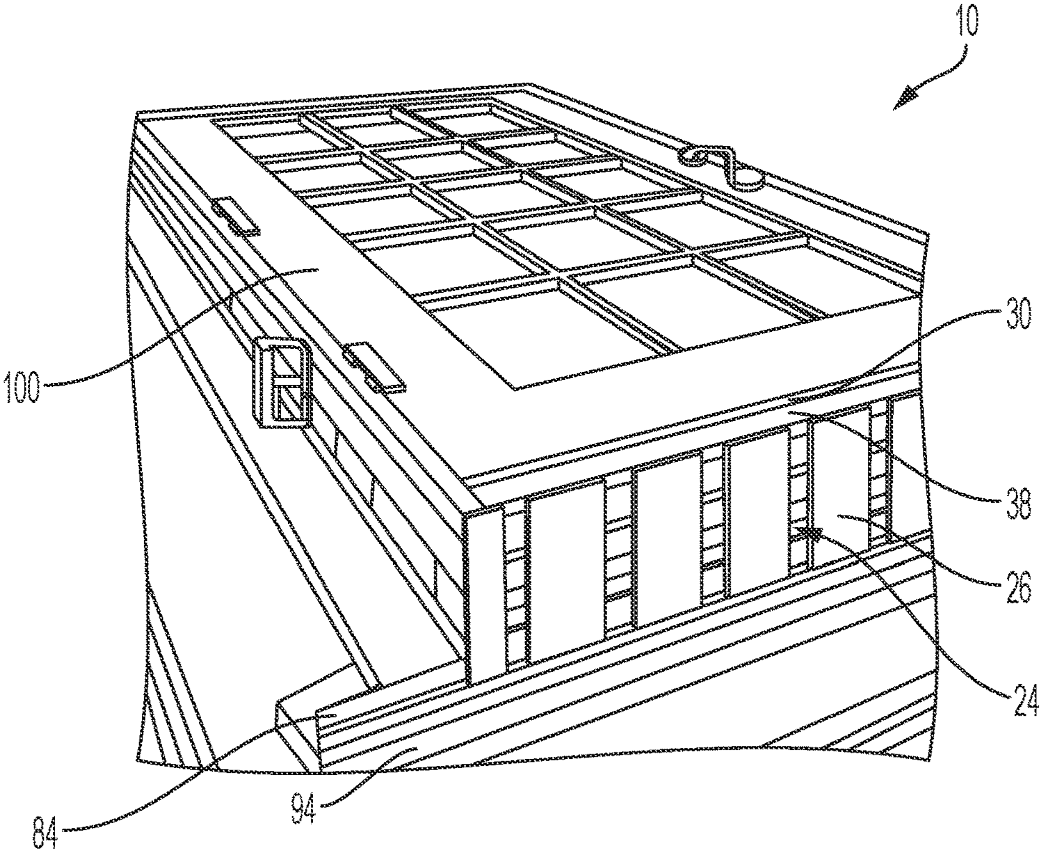
FIG. 4 is a bottom partial perspective view of the door frame and threshold assembly shown in FIG. 1.
Figure 5:
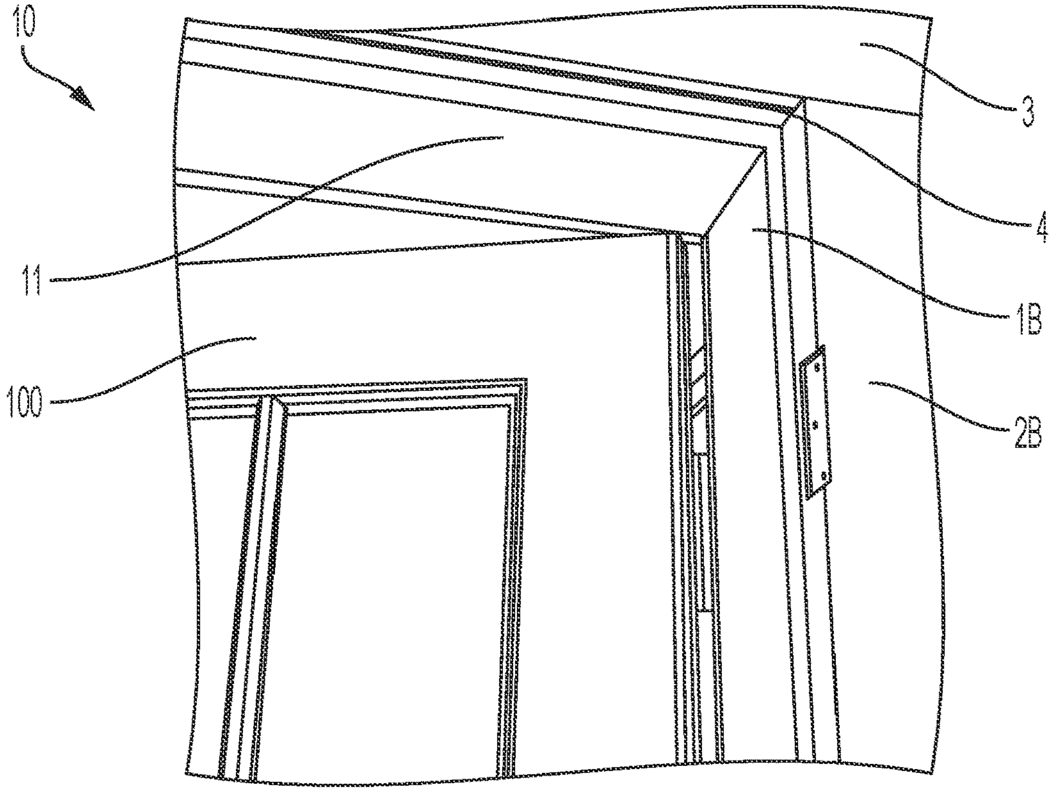
FIG. 5 is a partial perspective view of the door frame and threshold assembly shown in FIG. 1.
Figure 6:
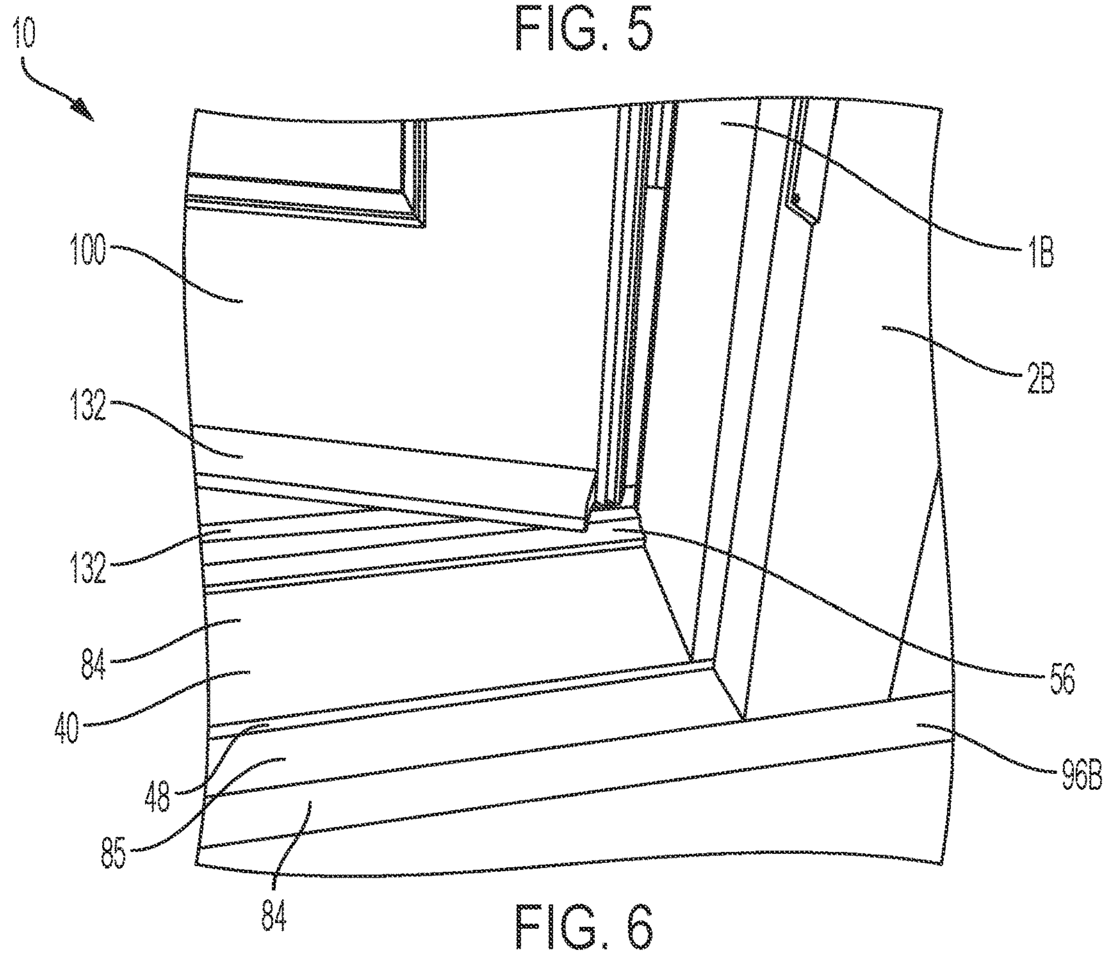
FIG. 6 is a partial perspective view of the door frame and threshold assembly shown in FIG. 1.
Figure 7:
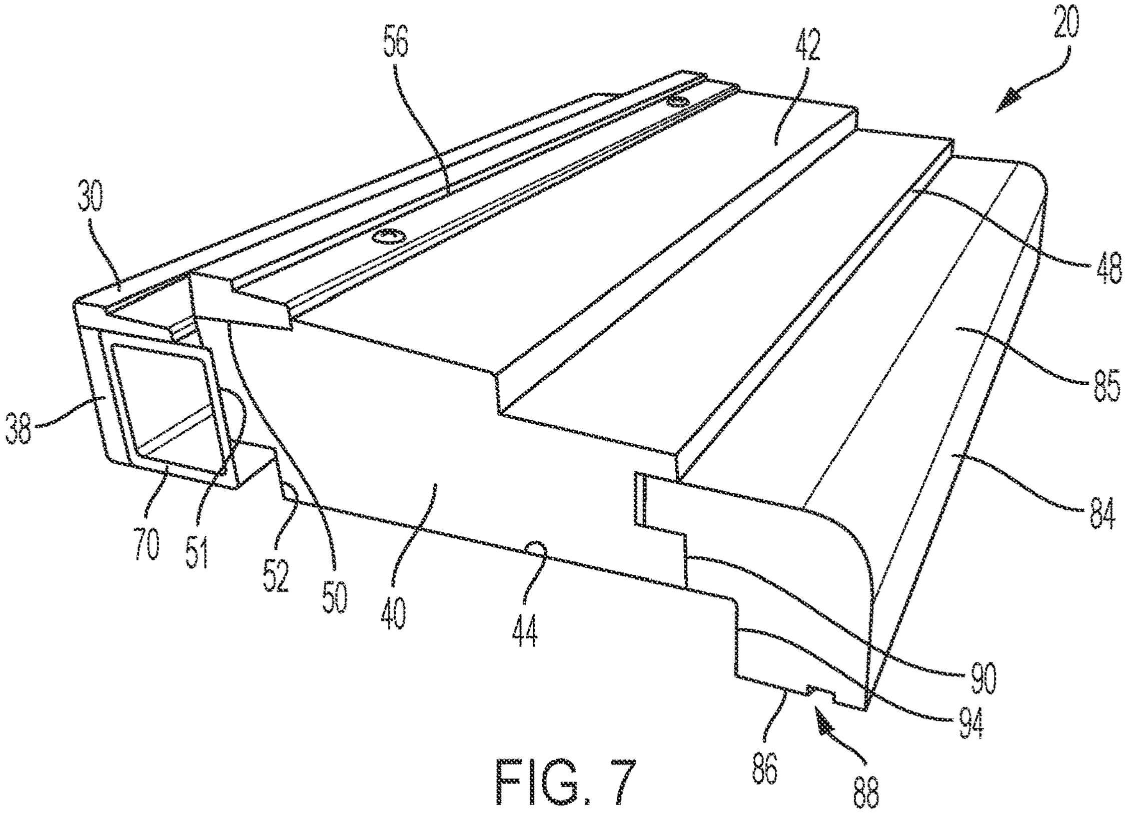
FIG. 7 is a perspective view of the door threshold assembly as shown in FIG. 1.
Figure 8:
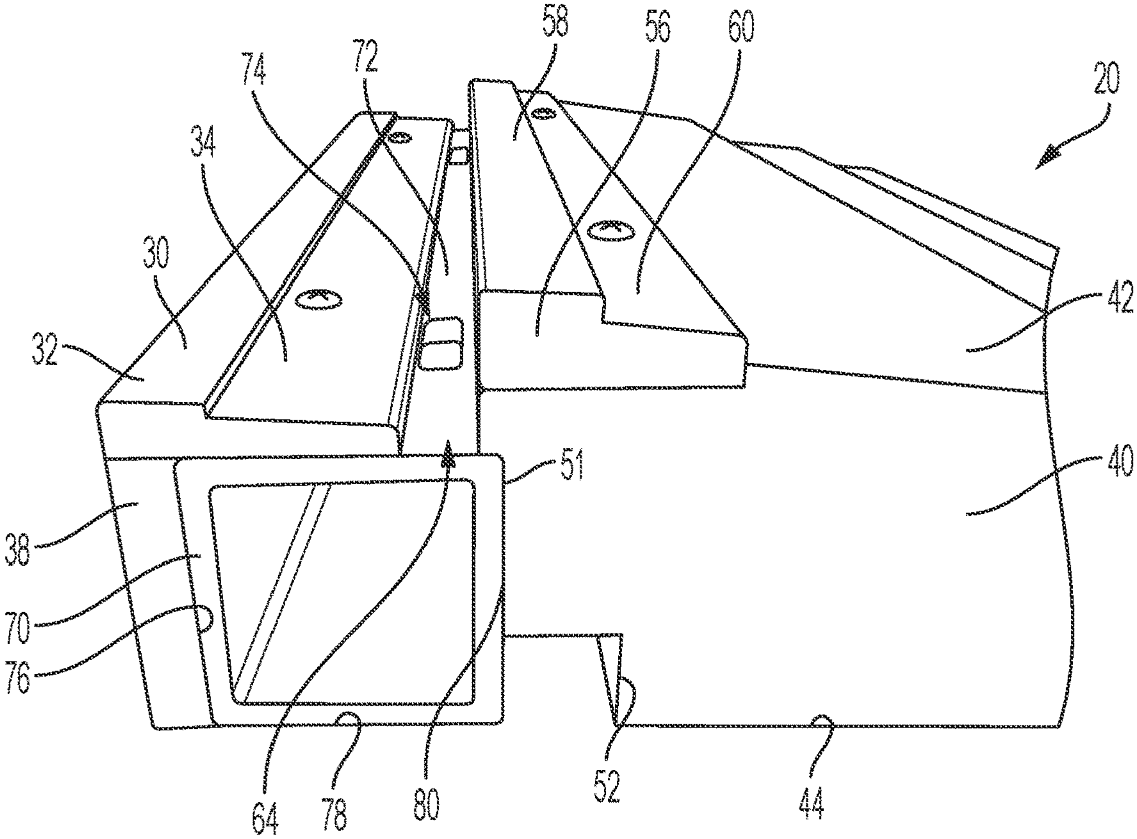
FIG. 8 is a partial perspective view of the door threshold assembly shown in FIG. 7; and, FIG. 9 an enlarged cross-sectional view taken from FIG. 2.

FIG. 2 is a partial cross-sectional schematic view of door frame and threshold assembly 10. FIG. 3 is a top partial perspective view of door frame and threshold assembly 10. FIG. 4 is a bottom partial perspective view of door frame and threshold assembly 10. FIG. 5 is a partial perspective view of door frame and threshold assembly 10. FIG. 6 is a partial perspective view of door frame and threshold assembly 10. FIG. 7 is a perspective view of door threshold assembly 20. FIG. 8 is a partial perspective view of door threshold assembly 20. The following description should be read in view of FIGS. 1-8.

Door threshold assembly 20 generally comprises sill pan 22, interior sill portion 30, exterior sill portion 40, door stop 56, tube or channel 70, and nose 84. Sill pan 22 is arranged under at least exterior sill portion 40. More specifically, exterior sill portion 40, tube 70, and vertical member 38 are arranged on top of sill pan 22. Sill pan 22 is operatively arranged to catch water from tube 70 and drain it away from door 100, in direction D4. To achieve this object, one or more shims 26 are arranged between sill pan 22 and exterior sill portion 40 (see FIG. 4). Shims 26 form shim space such that bottom surface 44 and bottom surface 78 are separated from sill pan 22 by shim space or conduit 24. Shim space 24 provides the conduit for the flow of water. In some embodiments, sill pan 22 comprises a vertical member that, along with notch 94 of nose 84, forms space or exit 28. In some embodiments, space 28 is perpendicular to shim space 24. In some embodiments, sill pan 22 is angled elevationally downward in direction D4 to promote fluid flow toward space 28. In some embodiments, sill pan 22 comprises a vertical member that extends along vertical member 38 in direction D1. Such vertical member is operatively arranged to catch fluid that falls from surface 32 of interior sill portion 30 in direction D3.

Tube 70 is arranged on sill pan 22, specifically, on shims 26. In some embodiments, tube 70 comprises a square cross-section including top surface 72, rear surface 76, bottom surface 78, and front surface 80. In some embodiments, tube 70 comprises fiberglass. Top surface 72 comprises weep hole 74. Weep hole 74 is arranged off center and proximate front surface 80. Front surface 80 comprises week hole 82. Weep hole 82 is arranged off center and proximate bottom surface 78. In some embodiments, door threshold assembly 20 further comprises vertical member 38 arranged on shims 26 adjacent to rear surface 76. In some embodiments, vertical member 38 abuts against rear surface 76. The height of tube 70 is equal to the height of vertical member 38.

Interior sill portion 30 is arranged on tube 70. Interior sill portion 30 comprises a stepped top surface, for example, top surface 32 and top surface 34, and bottom surface 36. In some embodiments, bottom surface 36 completely covers vertical member 38 and only partially covers top surface 72. In some embodiments, top surface 32 is parallel to bottom surface 36. In some embodiments, top surface 34 is arranged elevationally below top surface 32 and is non-parallel to bottom surface 36. For example, top surface 34 is angled elevationally downward in direction D4. The design of interior sill portion 30 facilitates the drainage of fluid collected on top surfaces 32 and 34 down through weep hole 74 in direction D2. Fluid that flows through weep hole 74 then flows out of tube 70 in direction D4 via weep hole 82 and down onto sill pan 22 in direction D2. The fluid then drains through shim space 24 in direction D4 and out of door threshold assembly in direction D2 via exit 28.

Exterior sill portion 40 is arranged on sill pan 22, specifically, on shims 26. Exterior sill portion 40 comprises top surface 42, bottom surface 44, rear surface 46, and front surface 48. Top surface 42 is non-parallel to bottom surface 44. For example, top surface 42 is angled elevationally downward in direction D4. This allows fluid that collects on exterior sill portion 40 to drain away from door 100. Top surface 42 comprises notch 50 which extends in direction D2 therefrom. Rear surface 46 comprises notch 51 that extends in direction D4 therefrom. Notch 51 engages top surface 72 and front surface 80 of tube 70. Space 64 is formed on surface 72 between rear surface 46 of exterior sill portion 40 and interior sill portion 30. Weep hole 74 is arranged in space 64. Bottom surface 44 comprises notch 52 that extends in direction D1 therefrom. Notch 52 is operatively arranged to allow the flow of fluid from weep hole 82 to sill pan 22. Front surface 48 comprises groove 54 which extends in direction D3 therefrom. Groove 54 is operatively arranged to engage protrusion 92 of nose 84, as will be described in greater detail below. In some embodiments, and as shown in FIGS. 7-8, top surface 42 may be a stepped surface comprising two or more steps.

Door stop 56 is engaged in notch 50 of exterior sill portion 40. Door stop 56 is operatively arranged to engage door 100 to prevent it from displacing toward the exterior (i.e., in direction D4). Door stop 56 comprises a stepped top surface, for example top surface 58 and top surface 60, and bottom surface 62. In some embodiments, top surface 58 is parallel to bottom surface 62. In some embodiments, top surface 60 is arranged elevationally below top surface 58 and is non-parallel to bottom surface 62. For example, top surface 60 is angled elevationally downward in direction D4. The design of door stop 56 facilitates the drainage of fluid collected on top surfaces 58 and 60 down to top surface 42 of exterior sill portion 40 in direction D4. Top surface 60 is arranged elevationally above top surface 42. In some embodiments, door stop 56 and exterior sill portion 40 are integrally formed.

Nose 84 is a curved, L-shaped component connected to exterior sill portion 40. Nose 84 comprises top surface 85, bottom surface 86, and rear surface 90. Top surface 85 is angled elevationally downward in direction D4. In some embodiments, top surface 85 is also curvilinear and has a front portion that extends downward in direction D2. Bottom surface is arranged elevationally below both exterior sill portion 40 and shim space 24. Bottom surface 86 comprises drip kerf 88. Drip kerf 88 is a notch in bottom surface 86 extending in direction D1. Drip kerf 88 catches water trying to flow down around nose 84 and onto bottom surface 86 in direction D3. The tendance of water, due to its surface tension or "dinginess," is to flow down along top surface 85, onto surface 86, and fall off of surface 86 generally in direction D3. Drip kerf 88 breaks this surface tension and stops the flow of water in D3, otherwise directing water downward in direction D2. Rear surface 90 comprises protrusion 92 extending therefrom in direction D3 and operatively arranged to engage groove 54 to connect nose 84 to exterior sill portion 40. In some embodiments, protrusion 92 engages groove 54 via interference fit, although it should be appreciated that other means for connection may be used, for example, adhesives, bolts, screws, nails, etc. Rear surface 90 further comprises notch 94 extending therefrom in direction D4. Notch 94 allows fluid flowing through shim space 24 to exit door threshold assembly, specifically but forming space 28. As previously described, space 28 is directed downward in direction D2. As shown in FIG. 1, in some embodiments nose 84 comprises horns 96A-B.

Head jamb 11 is connected to side jambs 1A-B (see FIGS. 1 and 5). Side jambs 1A-B are arranged on at least one of top surface 42, top surface 58, top surface 60, top surface 72, top surface 34, and top surface 32 (see FIGS. 3 and 6). Head jamb 11 comprises top surface 12, bottom surface 14, front surface 16, and rear surface 17. Top surface 12 comprises one or more notches. Bottom surface 14 comprises notch 15 extending in direction D1 therefrom. Similar to door stop 56, notch 15 is operatively arranged to engage door 100 to prevent it from displacing toward the exterior (i.e., in direction D4). Head casing 3 is connected to front surface 16. Head casing 3 comprises drip kerf 4 on its bottom surface. Drip kerf 4 prevents water from flowing from the front surface to the bottom surface of head casing 3 (i.e., in direction D3 toward door 100). Instead, as water flows down head casing 3 and interacts with drip kerf 4, it is directed down in direction D2 and only top surface 6. Since top surface 6 is beveled, the water then flows in direction D4 off of top surface 6 and away from door 100. In some embodiments, head jamb 11 and head casing 3 are integrally formed. In some embodiments, drip kerf 4 is formed on a bottom surface of head jamb 11, for example in a notch extending from front surface 16 in direction D3; however, drip kerf 4 should be arranged above top surface 6.

Screen or storm door 5 is hingedly connected, on one side, to one of side jambs 1A and 1B. Door 5 may include any necessary hardware, for example, a handle, deadbolt, locks, etc. Door 5 may or may not include windows. When in a closed position, door 5 is arranged proximate to and/or engages and/or abuts against front surface 16 and front surface 48. Thus, front surfaces 16 and 48 are operatively arranged to engage door 5 to prevent it from displacing toward the interior (i.e., in direction D3). Door 5 comprises top surface 6 and bottom surface 7. Top surface 5 is angled elevationally downward in direction D4. Bottom surface 7 is angled elevationally downward in direction D4. The downward angle of surfaces 6 and 7 ensure that any fluid collected thereon flows toward the exterior, in direction D4.

Door 100 comprises front surface 102, rear surface 104, top surface 106, and bottom surface 118. Top surface 106 comprises groove 108 extending therefrom in direction D2. Weather stripping 110 is arranged in groove 108 and is operatively arranged to provide a seal between door 100 and head jamb 11. Top surface 106 further comprises a notch extending therefrom in direction D2 and forming top surface 112. Top surface 112 comprises groove 114 extending therefrom in direction D2. Weather stripping 114 is arranged in groove 114 and is operatively arranged to engage bottom surface 14 to provide a seal between door 100 and head jamb 11. Bottom surface 118 comprises groove 124 extending therefrom in direction D1. Weather stripping 126 is arranged in groove 124 and is operatively arranged to provide a seal between door 100 and door stop 56. Bottom surface 118 further comprises a notch extending therefrom in direction D1 and forming bottom surface 128. Bottom surface 128 comprises groove 129 extending therefrom in direction D1. Weather stripping 130 is arranged in groove 129 and operatively arranged to engage top surface 58 to provide a seal between door 100 and door stop 56. Bottom surface 118 further comprises groove 120 extending therefrom in direction D1. Weather stripping 122 is arranged in groove 120 and operatively arranged to engage top surface 32 to provide a seal between door 100 and interior sill portion 30.

It should be appreciated that grooves 108 and 124 are essentially a single groove that spans the entire lateral surface of door 100. Thus, a single groove is cut into door 100 on each of its four lateral sides, and weather stripping, for example weather stripping 110 and 126, is arranged therein (weather stripping in lateral grooves would provide a seal between door 100 and side jambs 1A-B). Similarly, grooves 114 and 129 are essentially a single groove that spans the entire lateral surface of door 100. Thus, a single groove is cut into door 100 on each of its four lateral sides, and weather stripping, for example weather stripping 116 and 130, is arranged therein (weather stripping in lateral grooves would provide a seal between door 100 and side jambs 1A-B). As such, door 100 comprises two separate strips of weather stripping around the entirety of the lateral surfaces (i.e., the perimeter) thereof.

Drip cap 132 is connected to front surface 102 proximate bottom surface 118. Drip cap 132 comprises top surface 134 and bottom surface 136. Top surface 134 is non-parallel to bottom surface 136. Specifically, top surface 134 is angled elevationally downward in direction D4. This allows fluid that collects on drip cap 132 to drain away from door 100. Drip cap 132 is operatively arranged to keep water from getting under door 100, thus further preventing penetration to the interior of the enclosure. Bottom surface 136 comprises drip kerf 138. Drip kerf 138 prevents water from flowing from the front surface of drip cap 132 to bottom surface 136 (i.e., in direction D3 toward door 100). Bottom surface 136 comprises groove 140 extending therefrom in direction D1. Sweep or weather stripping 142 is arranged in groove 140 and is operatively arranged to engage top surface 60 to provide a seal between drip cap 132 and door stop 56. In some embodiments, drip cap 132 is connected to front surface 102 using marine epoxy.

Figure 9:
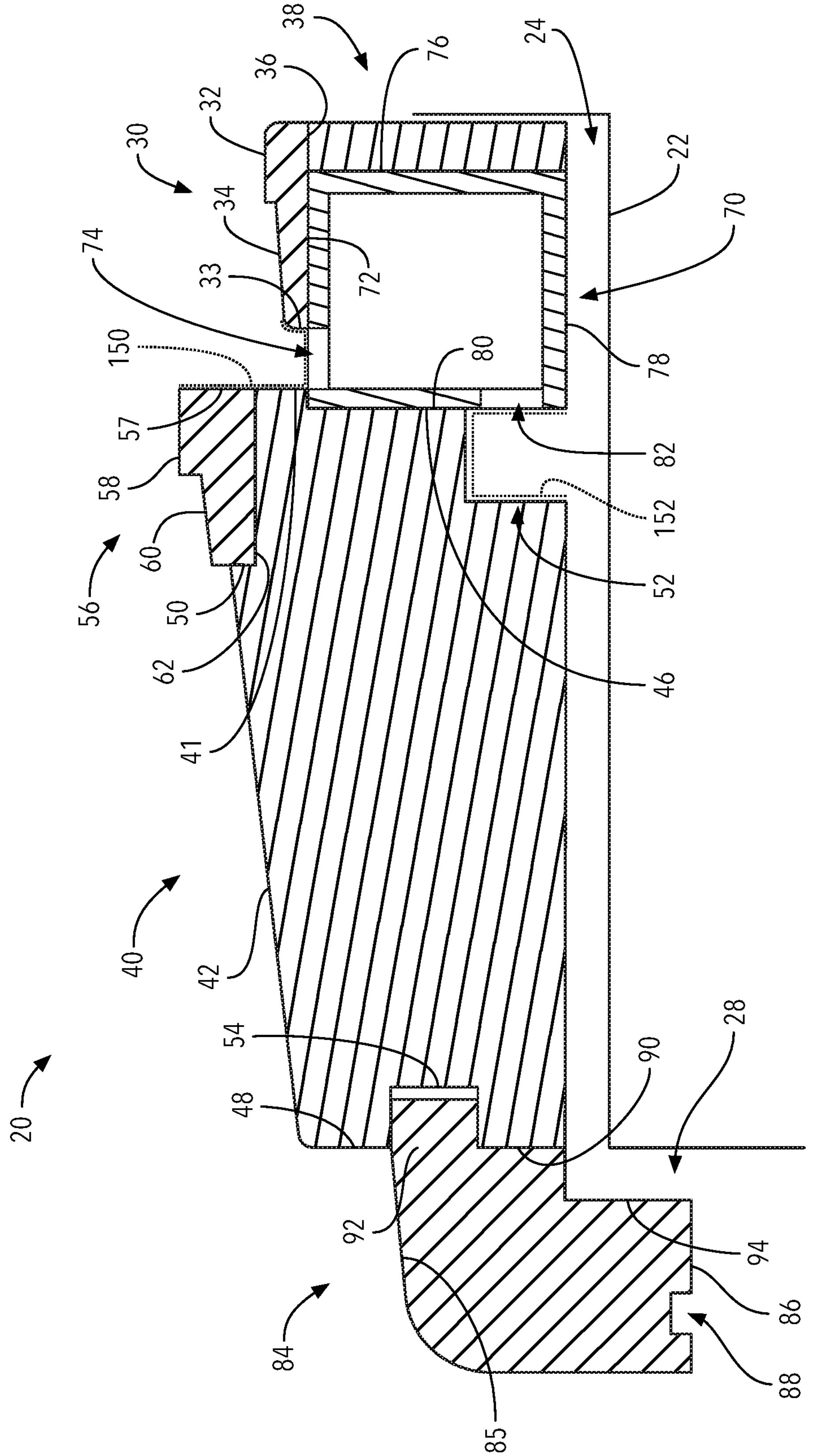

The following description should be taken in view of all of the aforementioned figures and FIG. 9, which generally illustrates an enlarged cross-sectional view of door threshold assembly 20 from FIG. 2. In some embodiments, assembly 20 may comprise upper channel 150 and lower channel 152. Upper channel 150 is formed by at least upper surface 72 (or a ceiling of tube 70), front edge 33 of interior sill portion 30, and upper rear surface 41 (or upper rear edge) of exterior sill portion 40. In other arrangements, upper channel 150 may be formed by upper surface 72 (or a ceiling of tube 70), front edge 33 of interior sill portion 30, upper rear surface 41 (or upper rear edge) of exterior sill portion 40, and rear surface 57 (or rear edge) of door stop 56. Lower channel 152 is formed by notch 52 of exterior sill portion 40 and front surface 80 of tube 70. Upper channel 150 is in fluid communication with weep holes 74 (i.e., a first plurality of weep holes) and weep holes 74 are in fluid communication with tube 70. Tube 70 is in fluid communication with weep holes 82 (i.e., a second plurality of weep holes) and weep holes 82 are in fluid communication with lower channel 152—lower channel 152 is in fluid communication with space 24 of sill pan 22.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

1A Jamb
1B Jamb
2A Casing
2B Casing
3 Head casing
4 Drip kerf
5 Screen or storm door
6 Top surface
7 Top surface
10 Door frame and threshold assembly
11 Head jamb
12 Top surface
13 Notch or notches
14 Bottom surface
15 Notch
16 Front surface

17 Rear surface
20 Door threshold assembly
22 Sill pan
24 Shim space
26 Shim or shims
28 Space
30 Interior sill portion
32 Top surface
33 Front edge
34 Top surface
36 Bottom surface
38 Vertical member
40 Exterior sill portion
41 Upper rear surface
42 Top surface
44 Bottom surface
46 Rear surface
48 Front surface
50 Notch
51 Notch
52 Notch
54 Groove
56 Door stop
57 Rear edge
58 Top surface
60 Top surface
62 Bottom surface
64 Space
70 Tube or channel
72 Top surface
74 Weep hole or holes
76 Rear surface
78 Bottom surface
80 Front surface
82 Weep hole or holes
84 Nose
85 Top surface
86 Bottom surface
88 Drip kerf
90 Rear surface
92 Protrusion
94 Notch
96A Horn
96B Horn
100 Door
102 Front surface
104 Rear surface
106 Top surface
108 Groove
110 Weather stripping
112 Top surface
114 Groove
116 Weather stripping
118 Bottom surface
120 Groove
122 Weather stripping
124 Groove
126 Weather stripping
128 Bottom surface
129 Groove
130 Weather stripping
132 Drip cap
134 Top surface
136 Bottom surface
138 Drip kerf
140 Groove
142 Weather stripping
150 Upper channel
152 Lower channel
D1 Direction
D2 Direction
D3 Direction
D4 Direction

What is claimed is:

1. A door frame and threshold assembly, comprising:

a substantially closed reservoir tube bounded by a floor, a first sidewall, a second sidewall and a ceiling, the ceiling having a first plurality of spaced apart weep holes therein and in communication with the reservoir tube, a second plurality of spaced apart weep holes in communication with the reservoir tube, the second plurality of spaced apart weep holes arranged in one of: the first sidewall; and, the second sidewall;

an interior sill portion arranged on the ceiling of the reservoir tube, the interior sill portion having a first sloped surface having a descending slope arranged in a direction towards the first plurality of spaced apart weep holes; and, an exterior sill portion at least abutting one of the sidewalls of the closed reservoir tube, the exterior sill portion having a second sloped surface having a descending slope arranged in a direction away from the closed reservoir tube, wherein a channel is formed by the ceiling of the closed reservoir tube, an edge of the interior sill portion, and an edge of the exterior sill portion, the channel in communication with the first plurality of spaced apart weep holes, wherein the exterior sill portion includes a lower notch arranged proximate the second plurality of spaced apart weep holes, the lower notch and one of the sidewalls of the closed reservoir tube forming a second channel, the second channel in communication with the second plurality of spaced apart weep holes.

2. The door frame and threshold assembly recited in claim 1, wherein the interior sill portion is made of wood.

3. The door frame and threshold assembly recited in claim 1, wherein the exterior sill portion is made of wood.

4. The door frame and threshold assembly recited in claim 1, wherein the interior sill portion and the exterior sill portion are made of wood.

5. The door frame and threshold assembly recited in claim 1 further comprising a door stop arranged on the exterior sill portion, the door stop including a third sloped surface having a descending slope arranged in a direction away from the first plurality of spaced apart weep holes.

6. The door frame and threshold assembly recited in claim 5, wherein the channel may be further formed by an edge of the door stop.

7. The door frame and threshold assembly recited in claim 5, wherein the exterior sill portion includes an upper notch proximate the closed reservoir tube and the door stop arranged substantially within the upper notch.

8. A door frame and threshold assembly, comprising:

a substantially closed reservoir tube bounded by a floor, a first sidewall, a second sidewall and a ceiling, the ceiling having a first plurality of spaced apart weep holes therein and in communication with the reservoir tube, a second plurality of spaced apart weep holes in communication with the reservoir tube, the second plurality of spaced apart weep holes arranged in one of: the first sidewall; and, the second sidewall;

an interior sill portion arranged on the ceiling of the reservoir tube, the interior sill portion having a first sloped surface having a descending slope arranged in a direction towards the first plurality of spaced apart weep holes; and, an exterior sill portion at least abutting one of the sidewalls of the closed reservoir tube, the exterior sill portion having a second sloped surface having a descending slope arranged in a direction away from the closed reservoir tube, the exterior sill portion having a lower notch arranged proximate the second plurality of weep holes, wherein an upper channel is formed by the ceiling of the closed reservoir tube, an edge of the interior sill portion, and an edge of the exterior sill portion, wherein a lower channel is formed by the lower notch of the exterior sill portion and one of the sidewalls of the closed reservoir tube.

9. The door frame and threshold assembly recited in claim 8, wherein the first plurality of spaced apart weep holes is in communication with the upper channel and the second plurality of spaced apart weep holes is in communication with the lower channel.

10. The door frame and threshold assembly recited in claim 8 further comprising a door stop arranged on the exterior sill portion, the door stop including a third sloped surface having a descending slope arranged in a direction away from the first plurality of spaced apart weep holes.

11. The door frame and threshold assembly recited in claim 10, wherein the upper channel may be further formed by an edge of the door stop.

12. The door frame and threshold assembly recited in claim 10, wherein the exterior sill portion includes an upper notch proximate the closed reservoir tube and the door stop arranged substantially within the upper notch.

13. The door frame and threshold assembly recited in claim 8, wherein the exterior sill portion is made of wood.

14. The door frame and threshold assembly recited in claim 8, wherein the interior sill portion is made of wood.

15. The door frame and threshold assembly recited in claim 8, wherein the interior sill portion and the exterior sill portion are made of wood.

* * * * *